United States Patent
Wernersbach

(10) Patent No.: US 10,105,849 B1
(45) Date of Patent: Oct. 23, 2018

(54) MANUFACTURING SYSTEM HAVING ROBOTIC APPARATUS

(71) Applicant: Glen C Wernersbach, Cincinnati, OH (US)

(72) Inventor: Glen C Wernersbach, Cincinnati, OH (US)

( * ) Notice: Subject to any disclaimer, the term of this patent is extended or adjusted under 35 U.S.C. 154(b) by 284 days.

(21) Appl. No.: 14/799,067

(22) Filed: Jul. 14, 2015

(51) Int. Cl.
*G06F 19/00* (2018.01)
*B25J 9/16* (2006.01)
*B25J 9/00* (2006.01)

(52) U.S. Cl.
CPC ........... *B25J 9/1687* (2013.01); *B25J 9/0084* (2013.01)

(58) Field of Classification Search
CPC .............................. G05D 1/0293; G05B 19/41
USPC ........................................................ 700/109
See application file for complete search history.

(56) References Cited

U.S. PATENT DOCUMENTS

| | | | | |
|---|---|---|---|---|
| 4,821,207 A * | 4/1989 | Ming | ..................... | G05B 19/41 318/568.15 |
| 4,835,710 A * | 5/1989 | Schnelle | ................. | G05B 19/41 318/568.11 |
| 2007/0142967 A1* | 6/2007 | Volcic | .................... | B25J 9/1664 700/245 |
| 2008/0065359 A1* | 3/2008 | Rudolph | ............. | G06F 7/49989 703/2 |
| 2013/0211597 A1* | 8/2013 | Sommerville | ......... | B25J 9/1602 700/264 |
| 2013/0331644 A1* | 12/2013 | Pandya | ................... | B25J 9/1682 600/102 |
| 2016/0089791 A1* | 3/2016 | Bradski | .................... | B25J 9/163 700/214 |

* cited by examiner

*Primary Examiner* — Mohammad Ali
*Assistant Examiner* — Md Azad
(74) *Attorney, Agent, or Firm* — Mark F. Smith; Smith Brandeuburg Ltd

(57) ABSTRACT

A manufacturing system having a master controller for monitoring and controlling a master axis of a manufacturing line and one or more individual robotic apparatus with an end point capable of performing two dimensional or three dimensional movements and a robotic control system that interacts with the master controller such that standard motion commands from the master controller are used to modify the end points in response to changes in the master axis.

20 Claims, 8 Drawing Sheets

MANUFACTURING SYSTEM HAVING ROBOTIC APPARATUS

BACKGROUND OF THE INVENTION

The subject invention is directed to a manufacturing system and more particularly, to a manufacturing system having one or more robotic apparatus operating under the control of a master controller that monitors and controls a master axis of the manufacturing system (such as a production or assembly line). Each one or more individual robotic apparatus having at least one articulated device, such as an arm, with an end point and a robotic control system that interacts with the master controller such that a two or three dimensional vector path of the end point is mapped onto a single dimensional representation such that standard motion commands from the master controller is used to modify the axis object of the end point in response to changes in the master axis.

Since their inception master controllers, such as proportional-integral-derivative control systems (PID), distributed control systems (DCS) and programmable logic control systems (PLC) and their functional successors (i.e. programmer automation controllers, PC based control, etc.) in industrial applications have been utilized in cooperation with motion planning systems using single dimensional motion parameters to command the movement of rotary motors providing a layer of abstraction from the actual driving electronic pulses (i.e. a drive). An axis object is a collection of one or more motion parameter (position, velocity, acceleration, jerk, etc.) outputs of a motion planning system at a specific time or a repeatable time interval. By having all axis objects commanded by control systems utilizing a common time clock, it is possible to synchronize the movement of the equipment preforming different functions in a manufacturing system.

For tooling operating in two or three-dimension space, a robot has traditionally been used. A robot is a machine with two or more motors to drive an end point(s) or arm(s)/appendage(s)/apparatus (hereinafter collectively referred to as an "arm") in two or three-dimensional space. There is usually a tool attached to the arm such as gripper or screwdriver further extending the actual end point. By controlling the individual motors to change the axis object of the end point using the robot control system, it possible to move the end point(s) of the arms(s) in a three dimensional Cartesian coordinate system with x, y and z measurements. The movement within and the dimensions of this three dimensional space is bound by limits on the travel distance of each motor, the length of the links connecting them together and other constraining features. Accordingly, in many applications more than three motors are used and the movement of one of those motors individually does not align directly with the x, y or z coordinates. Because of the need to control the motion at the end point in terms of its axis objects the movement of the end point is usually aided by a kinematic library which translates the desired x, y, and z positions and trajectory of the end point into individual movement commands directed to one or more of the underlying motors that operate to affect one or more of the axis objects. Because of the computing complexity of these operations, robots have traditionally been controlled separately by a proprietary robotic controller and not by a general-purpose master controller, such as a programmable logic control system (PLC).

The use of dedicated robotic controllers has been satisfactory for early adopting applications, which are generally single task uses, such as welding or palletizing, where the robot and its attached tool(s) are the central worker of the operation. However, the use of dedicated robotic controllers has been less successful in moving to coordinated applications such as for use in manufacturing lines. Manufacturing lines that comprise various types of devices, such as rotary motors systems and linear motor systems, are typically monitored, controlled and synchronized by a master controller, such as a PLC. A very key feature to such control of manufacturing lines is the use of a master axis having a time clock, which all the devices operating speeds are synced to. As the master axis speeds up or slows down, all devices on the line adjust their motion parameters (object axis) accordingly. Unfortunately, since the master controller and the robot controller operate using two separate processors with two separate real time clocks, it has been difficult to use a master controller with a master axis such that all the devices operate such that the motion of the end point of each robotic device or arm is successfully synchronized with the other devices controlled by the master controller.

Robot manufacturers have tried many different methods of ensuring that all of the devices in a manufacturing line are synchronized with the master axis. One method is to control each robot's object axis directly from the master controller as the other devices. This method requires importing or transferring control of all previous kinematic and robotic software libraries from the robot controller to the master controller's programming and hardware platform. It also requires that each robot use electronic driving hardware and motors that the master controller platform supports. Thus, a significant investment in development and time is necessary and it also relinquishes much of the control of the robotic manufacture's product enhancement ability to the master controller's platform's limits.

Another solution robotic manufacturers have developed includes placing external encoders on a rotary motor that is being driven by the master controller. The robotic controller can read the encoder pulses and then match the speed of the robot's tool with that rotary motor. Problems associated with this method include the need for additional hardware, is only one-dimensional, only syncs for a very small portion of the tool's path, can only be in a straight line and while outside of the zone, and the robot cannot respond to changes in line speed.

Accordingly, it would be desirable to have a manufacturing system comprising a master controller for monitoring and controlling the master axis of the manufacturing system and one or more individual robotic apparatus each having a robotic control system that interacts with the master controller such that changes in the master axis automatically results in corresponding changes in the axis object of each individual robotic apparatus.

SUMMARY OF THE INVENTION

The subject invention is directed to a manufacturing system having one or more individual robotic apparatus, and more particularly, a manufacturing system having a master controller for monitoring and controlling a master axis of a manufacturing line and one or more individual robotic apparatus each having at least one articulated arm with an end point and a robotic control system that interacts with the master controller such that a two or three dimensional vector path of the end point is mapped onto a single dimensional representation such that standard motion commands from the master controller are used to modify the axis object of the end point in response to changes in the master axis.

A preferred embodiment of the manufacturing system of the subject invention comprises a master controller for monitoring and controlling a master axis, one or more individual robotic apparatus each having a robotic control system that interacts with the master controller and having at least one articulated arm with an end point that moves along a two or three dimensional predefined path. The predefined path comprises a plurality of discrete points, wherein each discrete point has a vector axis for directing the end point to move such that the end point is at a predefined location at a predetermined time. In operation, the motion controller functions to map the two or three dimensional predefined path onto a single dimensional virtual vector path, whereby the master controller operates to direct standard motion commands to the control system to modify the single dimensional virtual vector path in response to changes in the master axis. The robotic control system utilizes this single dimensional virtual vector path to change the vector axis of the end point at one or more of the plurality of discrete points.

In another preferred embodiment of the invention the manufacturing system, the two or three dimensional predefined path has a fixed distance and wherein the single dimensional virtual vector path has a distance that corresponds to the fixed distance of the two or three dimensional predefined path.

In another preferred embodiment of the invention the single dimensional virtual vector path comprises a plurality of discrete points, each point having a corresponding vector axis.

In another preferred embodiment of the invention the robotic control system operates such that each single dimension standard movement command is converted into a new two or three dimensional path having a plurality of new vector axis. The robot control system further operates to direct the end point along the new two or three dimensional path.

A preferred embodiment of the invention is a manufacturing system comprising a system control having a master controller for monitoring and controlling a master axis and at least one robotic control system for controlling one or more individual robotic apparatus, wherein each said at least one robotic control system interacts with the master controller. Each individual robotic apparatus has at least one articulated arm with an end point that moves along a two or three dimensional predefined path comprising a plurality of discrete points and each discrete point having a vector axis for directing the end point such that the end point is at a predefined location and orientation at a predetermined time. The system control operates to map the two or three dimensional predefined path onto a single dimensional virtual vector path, wherein the master controller operates to direct standard motion commands to the robotic control system to modify the single dimensional virtual vector path in response to changes in the master axis, and wherein the system control operates to convert the modified single dimensional virtual vector path back into the predefined path having a modified vector axis at one or more of the plurality of discrete points.

In a preferred embodiment of the invention the two or three dimensional predefined path has a fixed distance and wherein single dimensional vector path has a distance that corresponds to the fixed distance.

In another preferred embodiment of the invention the distance of the single dimensional vector path comprises a plurality of discrete points, each point having a corresponding vector axis.

In another preferred embodiment of the invention the robotic control system operates such that each single dimension standard movement command is converted back into the predefined two or three dimensional path having a plurality of discrete points, wherein one or more of the plurality of discrete points having a new vector axis.

In a preferred embodiment of the invention the manufacturing system comprises a monitoring system that operates to monitor the standard motion commands and determines if the modified vector axis at one or more of the plurality of discrete points is outside operating parameters of the one or more robotic apparatus.

In a preferred embodiment of the invention the monitoring system operates to create a new modified vector axis at one or more of the plurality of discrete points such that the modified vector axis is within the operating parameters and transmits the new modified vector axis to the system control whereby the system control adjusts the standard motion commands directing the end point, and wherein the monitoring system continues to operate until all of the virtual vector path operates within the operating parameters.

In a preferred embodiment of the invention, the monitoring system operates to monitor and transmit the locations of the endpoint along the two or three dimensional predefined path and the single dimensional virtual vector path and displays the locations on the human machine interface.

In a preferred embodiment of the invention the monitoring system operates to monitor and transmit the locations of the endpoint in relation to one or more individual motors/drives.

In a preferred embodiment of the invention the system control operates to activate or deactivate a tool at a predetermined time when the end point is at the predefined location and orientation.

In a preferred embodiment of the invention the system control operates to change a starting location of the two or three dimensional predefined path.

In another preferred embodiment of the invention the control system operates such that each single dimension standard movement command is converted back into the predefined two or three dimensional path having a plurality of discrete points, wherein one or more of the plurality of discrete points having a new vector axis.

Various other objects, advantages, and embodiments of the invention will be apparent from the following description, the accompanying drawings, and the appended claims.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
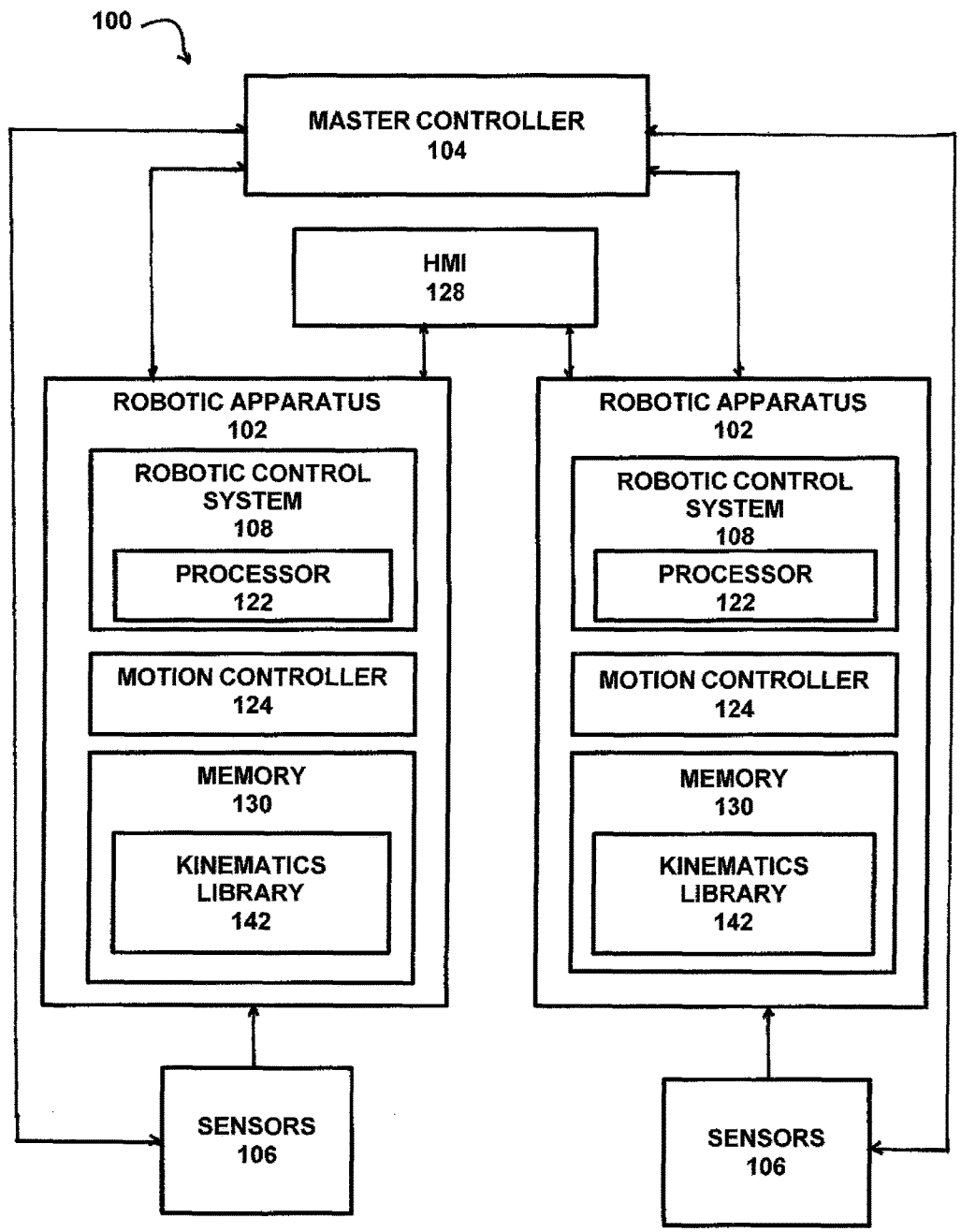
FIG. 1 a schematic representation of a preferred embodiment of a manufacturing system of the subject invention comprising one or more robotic apparatus that function to perform one or more of a variety of manufacturing processes including various assembly operations.

The subject invention is directed to a manufacturing system having one or more robotic apparatus operating in a manufacturing line. The manufacturing system comprises a master controller for monitoring and controlling a master axis and one or more robotic apparatus each having a robotic control system that utilizes a motion planning system that functions to map a two or three dimensional vector path of an end point of the robotic apparatus to a single dimensional representation such that standard motion commands from the master controller can be used to modify the axis object of each robotic apparatus in response to changes in the master axis. In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. As used herein, the term "manufacturing line" includes manufacturing, assembly and productions lines that operate to perform manufacturing operations and/or to perform assembly operations and/or to separate, package, retrieve, store and/or other line functions. As used herein the term "manufacturing process" includes manufacturing, assembly and production processes such as, but not limited to, manufacturing operations and/or assembly operations and/or to separate, package, retrieve, store and/or other operations. As used herein, the term "arm" refers to an appendage or a device connected to a robotic apparatus that moves within a defined space to place an end point at a specific location, orientation, and at a specific time to perform a function. As used herein the term "system control" refers to the master controller and/or one or more of the individual robotic control systems collectively, wherein the master controller and/or one or more of the individual robotic control systems can be at the same physical location (i.e. same proximate factory floor or even built into the same processor (such as a chip having a different core)) or at different locations.

As schematically illustrated in FIG. 1, a manufacturing system 100 is shown comprising one or more robotic apparatus 102 that function to perform one or more of a variety of manufacturing processes. The overall operation of the manufacturing system 100 is controlled by a master controller 104 that operates to continuously monitor the state of the manufacturing system 100, such as by utilizing a plurality of sensors 106. Preferably, the master controller 104 is a standard automation controller, such as a programmable logic controller (PLC) that operates using a high-level programming language to generate control commands that are passed to the various individual robotic control systems 108 that are in electrical communication through a plurality of cables and wires, or through a wireless system. It should be understood that the master controller can also be a proportional-integral-derivative control system (PID), a distributed control system (DCS), or a computer, such as a general purpose computer such as a personal computer (PC).

Figure 2:
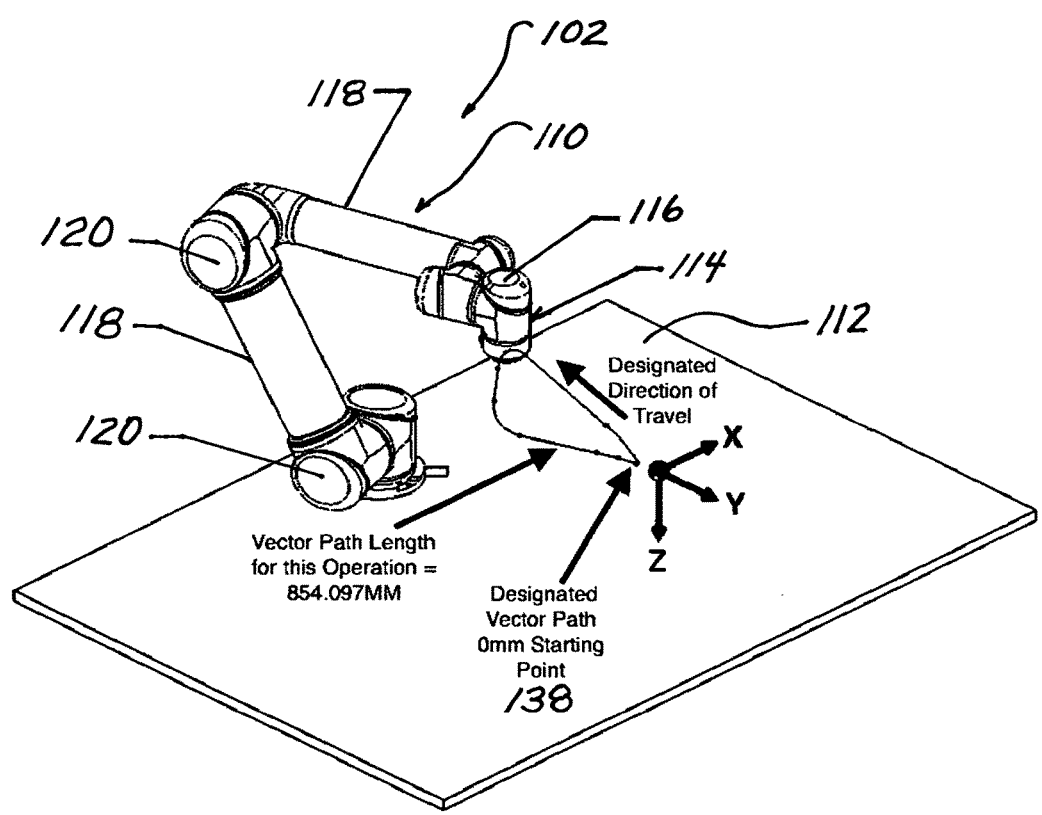
FIG. 2 is a schematic representation of an individual robotic apparatus of FIG. 1 that functions to perform one or more of a variety of manufacturing processes and/or various production and/or assembly operations and comprising at least one articulated arm and a base support, the articulated arm includes an end point and a tool attached to the end point.
Figure 3:
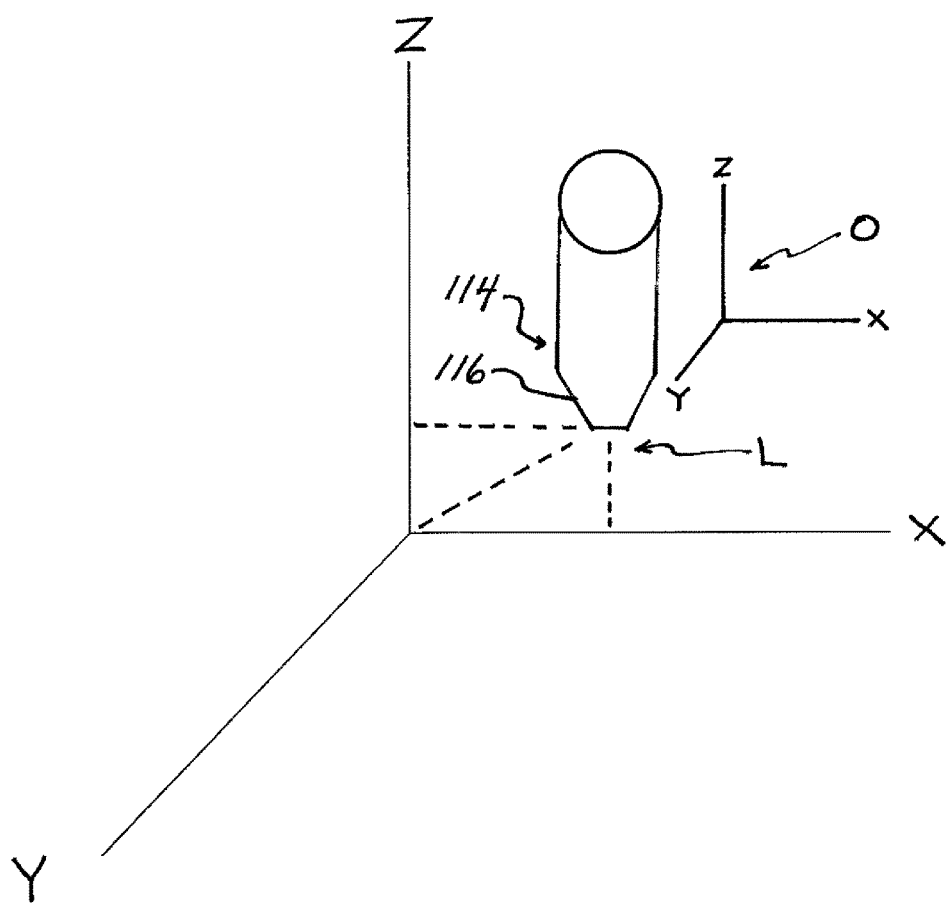
FIG. 3 is a schematic representation of the robotic apparatus showing it at a location and orientation.

Referring to FIG. 2, each robotic apparatus 102 functions to perform one or more of a variety of manufacturing processes and includes at least one arm 110, such as an articulated arm, and a base support 112. It should be understood that the base support 112 can be stationary or movable. The arm 110 includes a tool 114 attached to an end point 116 of the arm 110. Preferably, the tool 114 can be one or more of a variety of tools that can include, but not limited to, drilling tools, cutting tools, screwing tools, welding tools, grasping tools, or other such tools used with robotic devices. In a preferred embodiment, the arm 110 comprises a number of sections 118 movably connected together and one or more individual motors/drives 120 that all operate together with the robotic control system 108 to move the end point 116 and the attached tool 114 to a predefined location L and orientation O and at a predetermined time to permit the tool 114 to have the required degree of freedom of movement to perform a required operation (FIG. 3).

Preferably, the individual robotic control systems 108 are conventional proprietary controllers and can take the form of a programmable computer or other similar device having a processor 122 capable of implementing a robotic motion controller 124 and is coupled in electrical communication to an electric source (not shown), such as by a cable (not shown). It should be understood that each robotic control system 108 includes input and output devices (collectively referred to as a human machine interface (HMI), 128), a memory 130, and the robotic motion controller 124 (FIG. 1) that operates to provide instructions, using a machine code for the particular robotic apparatus, for implementing various axis object 132 to move each section 118 of the arm 110 such that the end point 116 and the tool 114 are placed at the predefined location L and orientation O at the predetermined time to perform the desired function.

Figure 4:
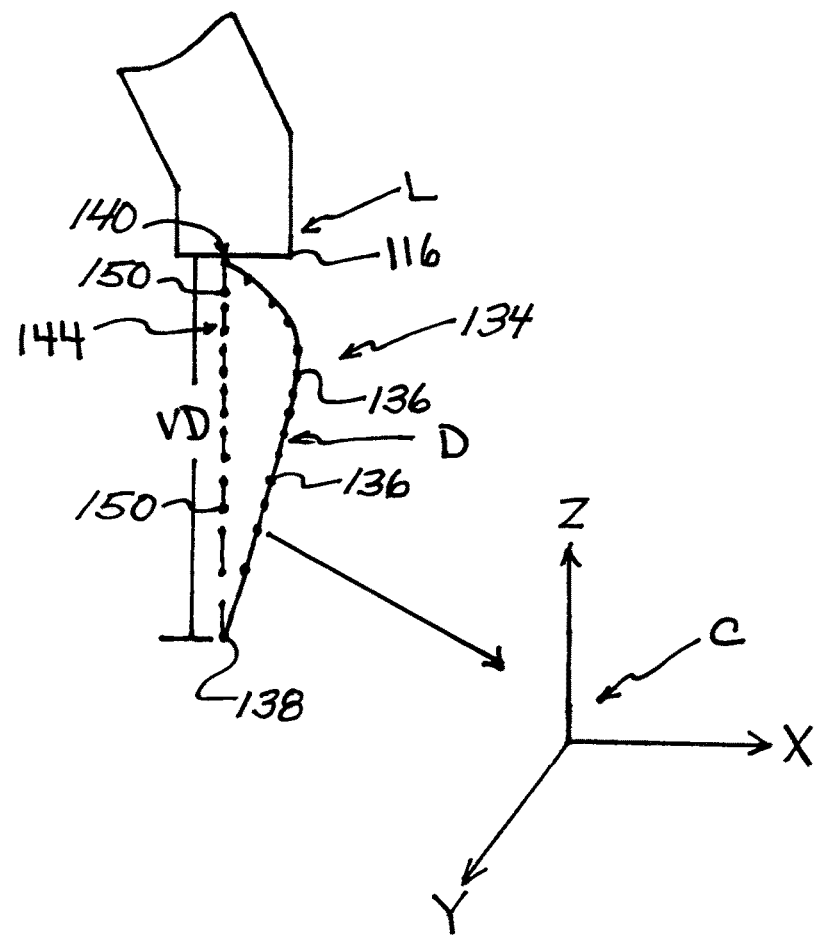
FIG. 4 is a schematic representation of a robotic apparatus showing a predetermined path having a starting location and an ending location and a plurality of discrete points there between and having a distance or length and a corresponding virtual vector path having the same starting location and ending location and a virtual distance that has a related distance or length.
Figure 5:
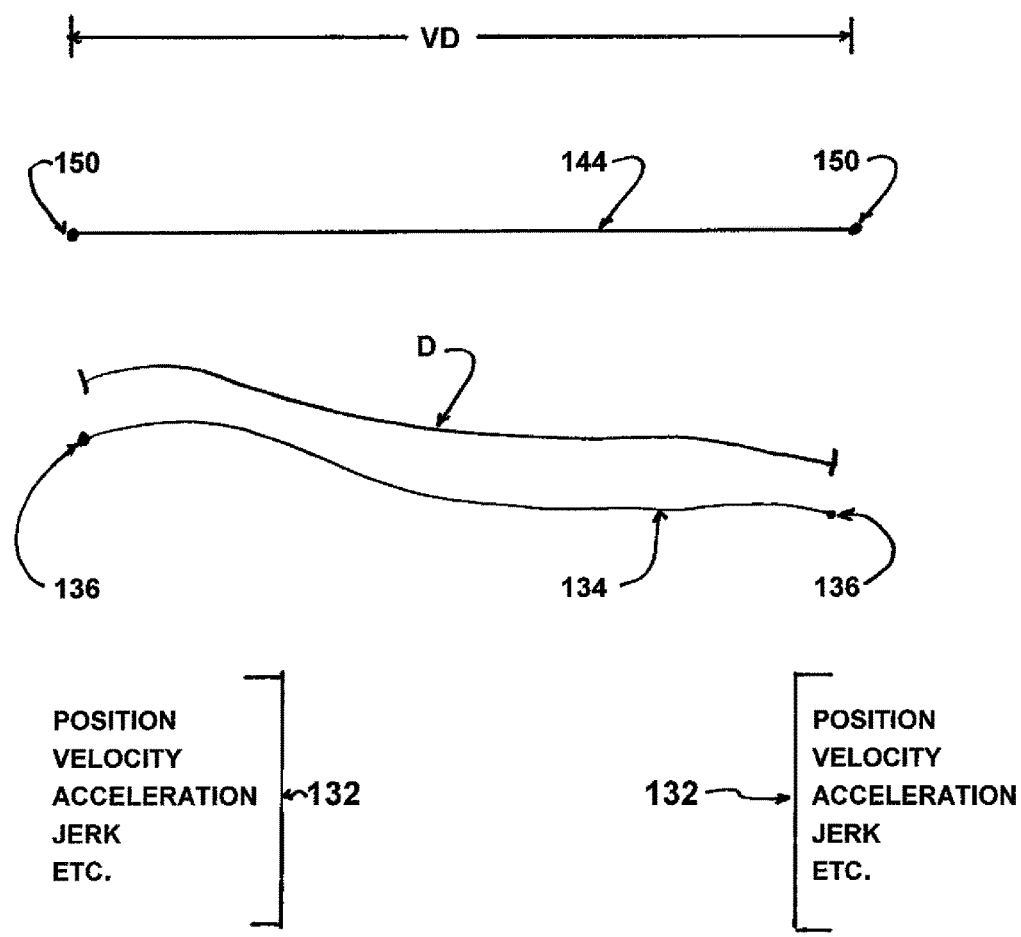
FIG. 5 is a schematic representation showing the virtual vector path and having discrete points and the predetermined path having discrete points, each point having an axis object.
Figure 6:
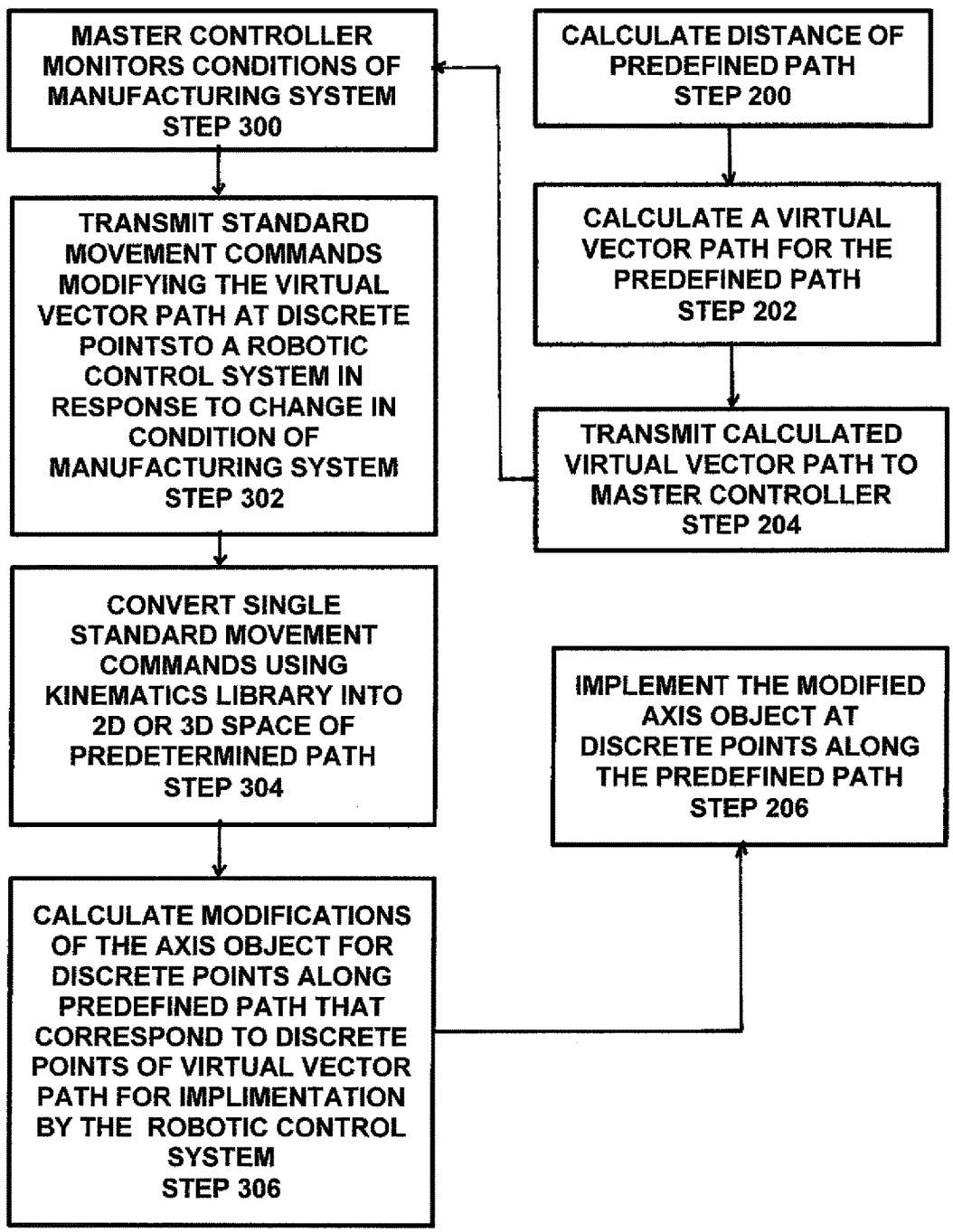
FIG. 6 is a flow diagram showing the interaction of the master controller in communication with the individual robotic control systems whereby the system control operates to map the two or three dimensional predefined path onto a single dimensional virtual vector path and wherein the master controller operates to modify the single dimensional virtual vector path in response to changes in the master axis and to convert the modified single dimensional virtual vector path back into the predefined path having a modified vector axis at one or more of the plurality of discrete points to compensate for changes in the master axis.

In operation as illustrated in FIGS. 1 and 4, a robotic apparatus 102 is directed by the robotic motion controller 124 to follow a predefined path 134 and the axis objects 132 (FIG. 5) for the predefined path 134 such that the end point 116 and the attached tool 114 are placed at a predefined location L and orientation O at a predetermined time. Such a predefined path 134 is defined by the coordinates C (FIG. 4) of the tool 114 at discrete points 136 along the predefined path 134 as well as the axis object 132 for the end point 116 at each discrete point 136. The predefined path 134 may be created using a variety of conventional known methods and is written using the computer language for the particular robotic apparatus, which can be a variety of computer languages known in the robotic industry.

In a preferred embodiment, the robotic motion controller 124 of the robotic control system 108 operates to create the predefined path 134 for moving the end point 116 and an attached tool 114 within permissible bounds of its physical two dimensional x, y coordinate space or a three dimensional x, y and z coordinate space. In one preferred embodiment, the starting location 138 of the predefined path 134 of the end point 116 is the same as the ending location 140 of the predefined path 134 thus forming a looping cycle in the dimensional space. In another preferred embodiment, the starting location 138 of the predefined path 134 and the ending location 140 are at different predefined locations. For a non-limiting exemplary illustration, the starting location could be the place where a robot using its tool lifts a package off a manufacturing (assembly) line and the ending location can be the place where the robot using its tool places the package in a correct space to fill a carton. It should be understood that the same predefined path could have a slightly different starting location at each looping cycle, thereby slightly changing the ending location of the predefined path in each cycle to place the package in the correct slot in a carton until this carton is full and the starting location returns to the original starting location thereby restarting the operation.

As illustrated in FIGS. 1, 4, 5 and 6, the various predefined paths 134 are defined using a plurality of discrete points 136, each point having a corresponding particular axis object 132 for the end point 116 all of which are stored in a kinematics library 142 within the memory 130 of the robot control system 108 or within the master controller 104. For a particular operation of the robotic apparatus 102, the distance (length) D that the end point 116 travels following a selected predefined path 134 is calculated by the robotic control system 108 and displayed on the HMI 128 (Step 200). In order to modify the axis object of each robotic apparatus in response to changes in the master axis, in a preferred embodiment, a virtual vector path 144 is calculated which is a single dimensional representation of the predefined path 134 having a distance VD that corresponds to the distance D the end point 116 would travel in its 2D or 3D dimensional space following the predefined path 134 (Step 202). It should be understood that the calculated distance VD can be a relative distance, such as in percentages (0 to 100%), or an angular distance, such as 0 to 360 degrees, or more preferably the distance would the actual distance (length) D that the end point travels along the predefined path 134, in units such as millimeters or inches.

Once the virtual vector path 144 has been calculated, the distance VD of the path 144 is calculated (such as by the robot control system or the master controller, or other device) and displayed on the HMI 128 and transmitted to the master controller 104, such as by an operator or electronically transmitted by a data tag, from the robotic control system 108 to the master controller 104 and updated automatically (Step 204).

During operation of the manufacturing system 100, the master controller 104 monitors the various conditions of the manufacturing system 100 including the status of the various operations being performed by each robotic apparatus 102, such as through the use of sensors 106 (Step 300), and transmits standard movement commands 146 to the robotic motion controller 124 of the robotic control system 108 which uses the standard movement commands 146 as axis object commands 148 (similar to commands used for physical rotary or linear devices) for each discrete point 150 defining the virtual vector path 144 such that the end point 116 and the tool 114 arrive at the predefined location L and orientation O at a predetermined time (Step 302).

It should now be understood that the subject invention operates such that standard movement commands 146 are in the form of a single dimension commands transmitted from the master controller 104 to the robotic control system 108 which can then be used as axis object commands 148 for processing by the robotic motion controller 124. Each single dimension standard movement command 146 is relative to the starting location 138 and distance D of the desired predefined path 134 of travel. Thus, a single dimension standard movement command 146 operates as an axis object command 148 for each discrete point 150 along the virtual vector path 144. The single dimension standard movement command 146 at each discrete point 150 are then converted using the kinematics library 142 into the two or three dimensional space defining the predefined path 134 (Step 304) and the modifications of the axis object 132 along the predetermined path 134 that correspond to the modified discrete points of the virtual vector path 144 is determined (Step 306) and the robot control system 108 operates to direct the specific physical motors/drives 120 on the robotic apparatus 102 needed to direct the motion of the end point 116 (Step 308), By receiving the successive single dimensional standard movement commands 146 for each discrete point 150 along the virtual vector path 144 and converting the virtual vector path 144 into an axis object 132 for a corresponding discrete point 136 (based on the distance from the starting point), the desired movement of the end point 116 and tool 114 is achieved such that they arrive at the predefined location L and orientation O at a new predetermined time.

Figure 7:
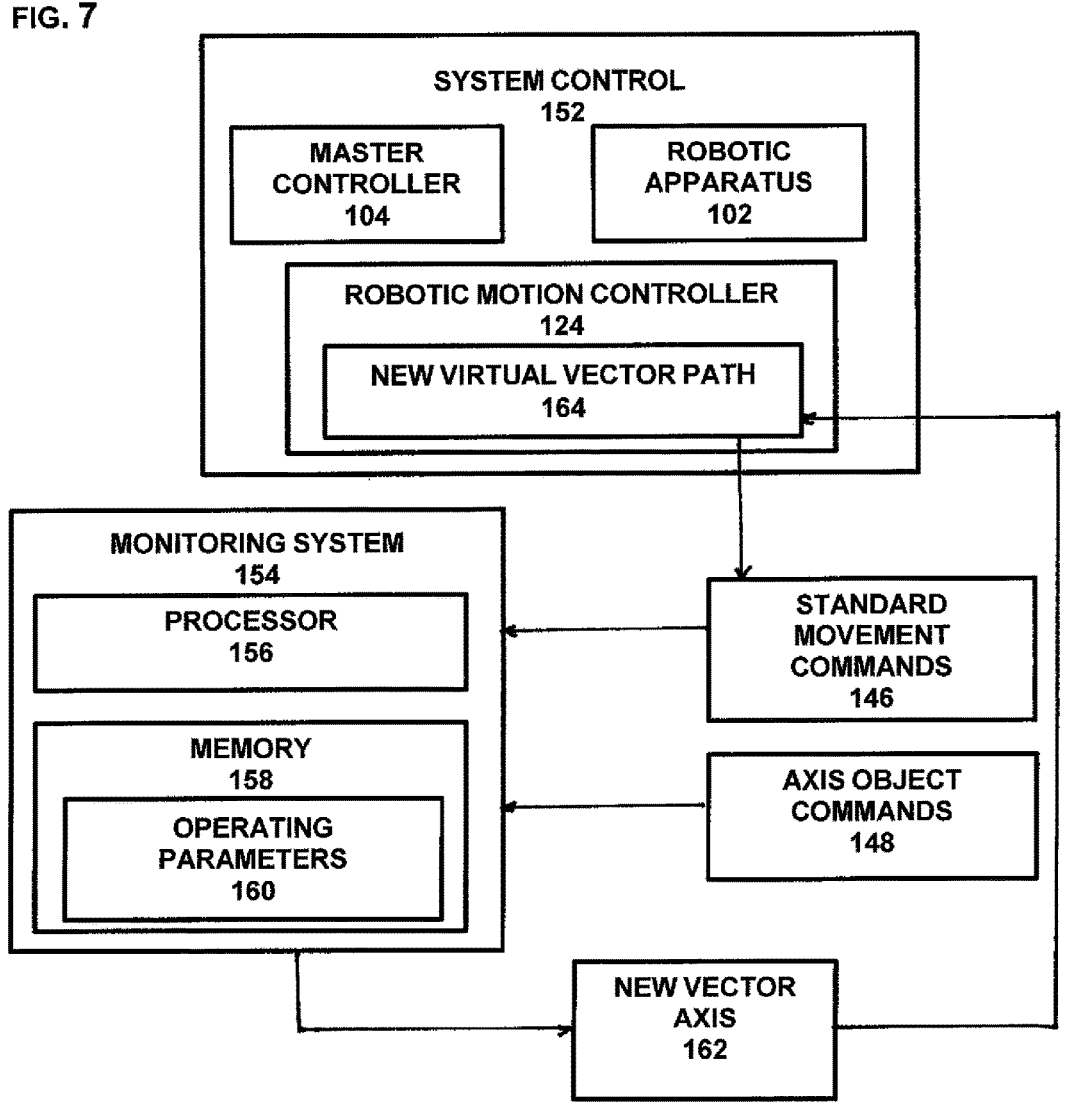
FIG. 7 is a schematic representation of a monitoring system of the manufacturing system showing the monitoring system in communication with the master controller and one or more of the robotic apparatus.
Figure 8:
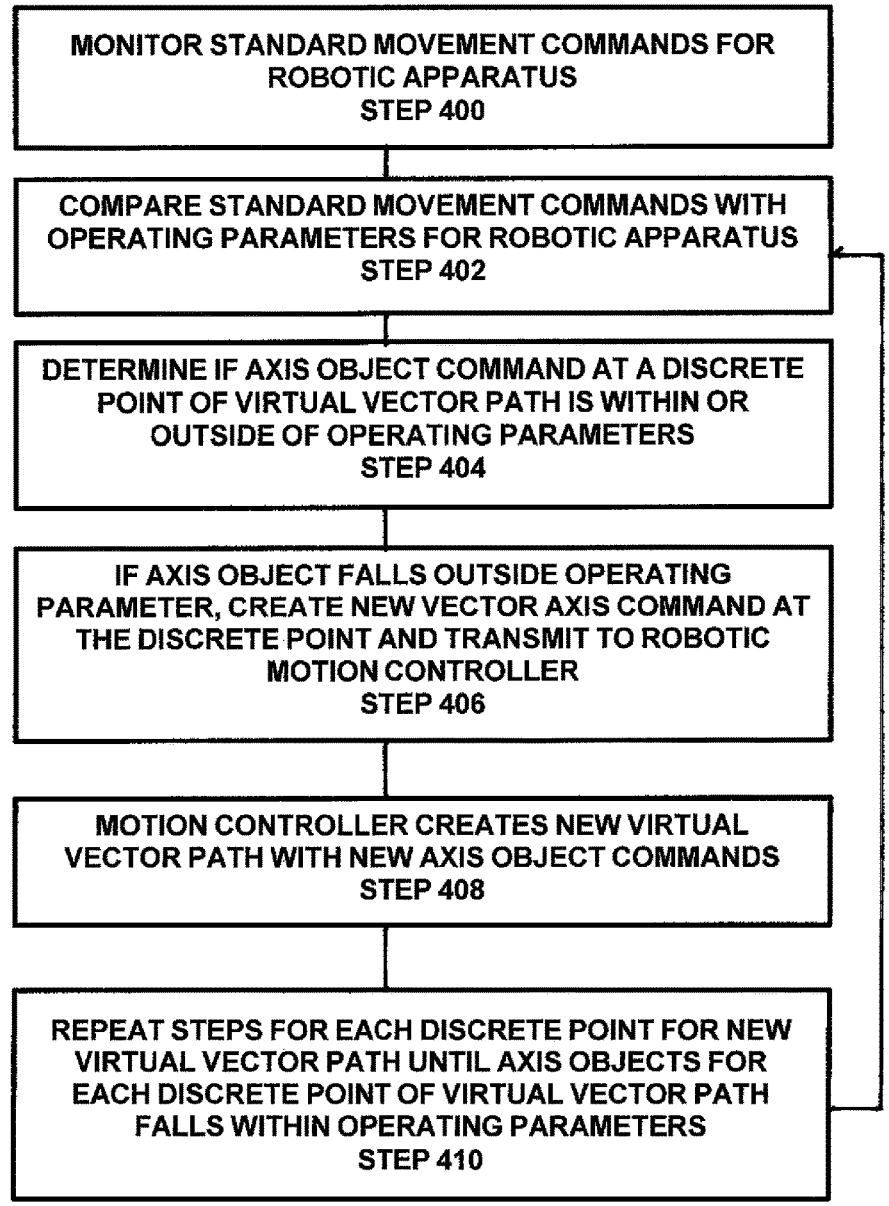
FIG. 8 is a flow diagram showing the operation of the monitoring system of FIG. 7 for monitoring the operation on one or more robotic apparatus.

In another preferred embodiment of the invention, the system control 152 is shown comprising the master controller 104 and one or more robotic control systems 108 and communicates with a monitoring system 154 that operates to monitor each of the robotic apparatus 102. Referring to FIGS. 7 and 8, the system control 152 operates to create single dimensional standard movement commands 146 to modify the operation of each robotic apparatus 102 in response to changes in the master axis of the manufacturing system 100. In a preferred embodiment, the monitoring system 154 includes a processor 156 and memory 158 that operates to determine if each single dimension standard movement command 146 at each discrete point 150 is within operating parameters 160 of the robotic apparatus 102. As shown in FIG. 8, the monitoring system 154 operates to monitor said standard movement commands 146 (step 400) and compares it with operating parameters 160 for the robotic apparatus 102 stored in the memory 158 (step 402) and determines if the axis object command 148 at a discrete point 150 is outside operating parameters 160 (step 404) which could result in damage to the robotic apparatus or the required movement of the robotic apparatus 102 could not be achieved. If the axis object command 148 at a discrete point 150 falls outside the operating parameters 160 of the robotic apparatus 102, the monitoring system 154 operates to create a new vector axis command 162 at the discrete point 150 (step 406) resulting in a new virtual vector path 144. The new vector axis command 162 is transmitted to the robotic motion controller 124 which creates a new virtual vector path 164 (step 408). In operation, the monitoring system 154 continues to operate as described until the vector axis commands at each discrete point comprising the virtual vector path are all within the operating parameters of the robotic apparatus (step 410) while ensuring that the end point 116 and tool 114 arrive at the predefined location L and orientation O at the predetermined time.

In another preferred embodiment of the invention the monitoring system 154 operates to monitor and transmit the location (its x, y or its x, y, z, coordinates) of the endpoint 116 as it travels along its two or three dimensional predefined path 134 and its location in relation to its single dimensional virtual vector path 144 and displays the locations on the human machine interface 128. In another preferred embodiment, the monitoring system 154 operates to monitor and transmit the locations, as defined above, of the endpoint 116 in relation to one or more of the individual motors/drives 120.

In a preferred embodiment of the invention, the system control 152 operates to activate or deactivate the tool 114 at a predetermined time when the end point 116 is at the predefined location and orientation. It should now be apparent to one skilled in the art that by controlling the activation and deactivation of the tool allows the manufacturing system to adjust for changes in operation. For a non-limiting illustration, if a part to be operated on by the tool arrives late, activation of the tool can be delayed until the part arrives at the location. Once the part arrives at the proper location, the tool can be activated to perform the desired operation.

In another preferred embodiment of the invention, the system control 152 operates to provide standard movement commands 146 that operate to provide the end point 116 with a new starting position 138 for starting its predefined path 134. It should now be apparent to one skilled in the art that by changing the starting position 138 the ending location 140 can be changed.

It should now be apparent to one skilled in the art that the subject invention allows a master controller to tightly control the motion of a robotic apparatus operating in a three dimensional boundary with single dimensional standard movement commands. Further, the subject invention allows the master controller of the manufacturing system to use single dimensional standard motion commands to vary the axis object to change orientation, speed up, slow down or stop the end point along a predefined path such that it arrives at a predefined location and orientation at a predetermined time. Further, by modifying the virtual vector path of an end point, the master controller can operate to direct the robotic control system to transition to another predefined path and effectively build a recipe of different robotic operations. It should also now be apparent to one skilled in the art that using a single dimension virtual vector path to represent the end point's path permits the master controller to coordinate and maintain synchronization of the various assembly and/or manufacturing operations being performed along the manufacturing system. Accordingly, changes to the master axis of the manufacturing system can be monitored by the master controller which communicates commands to the individual robotic control systems, such as to modify the axis object to maintain synchronization of the entire manufacturing system. in this way, the speed of the entire manufacturing system can be varied. For a non-limiting exemplary illustration, as the speed of the master axis increases, the speed of operation of the individual components (the individual robotic apparatus) can increase. As the speed of the master axis slows down or stops the entire manufacturing system follows including each of the individual robotic apparatus. Thus, the manufacturing system remains synchronized with the master axis.

In view of the foregoing it should now be apparent to one skilled in the art that the manufacturing system of the subject invention provides a system and method whereby a master controller operates to monitor and control the master axis of the manufacturing system overall including one or more individual robotic apparatus. Each robotic apparatus has a control system that interacts with the master controller such that a two or three dimensional vector path of an end point of the robotic apparatus is mapped to a single dimensional representation vector path such that standard motion commands from the master controller is used to modify the axis object in response to changes in the master axis.

I claim:

1. A manufacturing system having robotic apparatus operating in a manufacturing line synchronized by a master axis, the manufacturing system comprising:

a system control having a master controller for monitoring and controlling the master axis; and one or more individual robotic apparatus each having a robotic control system for controlling the operation of said individual robotic apparatus, wherein each said robotic control system interacts with said master controller; and each said individual robotic apparatus has an end point that moves along a two or three dimensional predefined path, wherein said predefined path has an actual distance that said end point travels following said predefined path, wherein said predefined path comprises a plurality of discrete points and each discrete point has a vector axis for directing said end point such that said end point is at a predefined location and orientation at a predetermined time;

wherein said system control operates to automatically map each said two or three dimensional predefined path onto a single dimensional virtual vector path having a vector path distance that corresponds to said actual distance and comprises a plurality of discrete points, wherein said master controller operates to direct standard movement commands in the form of single dimension commands to said robotic control system of said individual robotic apparatus and uses said standard movement commands as an axis object command at each said discrete point of said virtual vector path to modify said single dimensional virtual vector path in response to changes in the master axis, and wherein said system control operates to convert said modified single dimensional virtual vector path back into said predefined path such that said predefined has a modified vector axis at one or more of said plurality of discrete points such that said end point arrives at said predefined location and orientation at a new predefined time.

2. The manufacturing system of claim 1 further comprising a sensor that cooperates with said master controller for monitoring the condition of the manufacturing system.

3. The manufacturing system of claim 2 wherein said distance of said single dimensional vector path comprises a plurality of discrete points, each point having a corresponding point on the single dimensional vector path having a single dimensional movement.

4. The manufacturing system of claim 1 further comprising a monitoring system that operates to monitor said standard movement commands and determines if said modified single dimensional vector path movement at one or more of said plurality of discrete points is outside operating parameters of said one or more robotic apparatus.

5. The manufacturing system of claim 4 wherein said monitoring system operates to create a new modified single dimensional virtual vector path at one or more of said plurality of discrete points such that said modified single dimensional vector path is within said operating parameters and transmits said new single dimensional modified vector path movement to said system control whereby said system control adjusts said standard movement commands directing said end point, and wherein said monitoring system continues to operate until all of said modified virtual vector path movements operate within said operating parameters.

6. The manufacturing system of claim 1 further comprising a monitoring system that operates to monitor and transmit the locations of the endpoint along said two or three dimensional predefined path and displays said locations on a human machine interface.

7. The manufacturing system of claim 1 further comprising a monitoring system that operates to monitor and transmit the locations of the endpoint in relation to one or more individual motors/drives.

8. The manufacturing system of claim 1 wherein said system control operates to activate or deactivate a tool at a predetermined time when said end point is at said predefined location and orientation.

9. The manufacturing system of claim 1 wherein the manufacturing system comprises at least two individual robotic apparatus each having an axis object and a robotic control system for controlling said axis object, wherein each said robotic control system interacts with said master controller such that changes in the master axis results in changes in said axis object of each said individual robotic apparatus.

10. The manufacturing system of claim 1 wherein said system control operates such that each single dimension standard movement command at each point along said modified single dimensional virtual vector path is converted back into said predefined two or three dimensional path having a plurality of discrete points, wherein one or more of said plurality of discrete points having a movement.

11. A manufacturing system comprising:
a manufacturing line having a master controller for monitoring and controlling a master axis that operates to synchronizes individual components of said manufacturing line;
wherein said manufacturing line includes two or more individual robotic apparatus each having a robotic control system that interacts with said master controller and having an end point that moves along a two or three dimensional predefined path;
wherein two or three dimensional predefined path has an actual distance that that said end point travels, said predefined path comprises a plurality of discrete points, each discrete point having a vector axis for directing said end point to move to a predefined location at a predetermined time;
wherein said master controller functions to map said two or three dimensional predefined path onto single dimensional virtual vector path comprising a plurality of discrete points and having a vector path distance that corresponds to said actual distance;
wherein said master controller functions to direct standard movement commands in the form of single dimension commands at each discrete point along said virtual vector path to said robotic control system which operate as axis object commands to modify said single dimensional virtual vector path in response to changes in said master axis; and
wherein each standard movement command is converted using a kinematics library into two or three dimensional space defining said two or three dimensional predefined path such that said axis object at one or more of said discrete points of said predefined path is modified such that said end point arrives at a predefined location and orientation at a new predetermined time.

12. The manufacturing system of claim 11 wherein said master controller further operates to activate or deactivate each said robotic apparatus in response to changes is said master axis.

13. The manufacturing system of claim 12 wherein each said two or three dimensional predefined path has a fixed distance and wherein said single dimensional virtual vector path has a distance that corresponds to a fixed distance of said two or three dimensional predefined path.

14. The manufacturing system of claim 11 further comprising a sensor that cooperates with said master controller for monitoring the condition of the manufacturing system.

15. The manufacturing system of claim 11 further comprising a monitoring system that operates to monitor said standard movement commands and determines if movement of said robotic apparatus at one or more of said plurality of discrete points is outside operating parameters of said robotic apparatus.

16. The manufacturing system of claim 15 wherein said monitoring system operates to create a new movement at one or more of said plurality of discrete points such that said new movement is within said operating parameters and transmits said new movement to said system control whereby said system control adjusts said standard movement commands directing said end point, and wherein said monitoring system continues to operate until all of said virtual vector path movements operate within said operating parameters.

17. The manufacturing system of claim 11 further comprising a monitoring system that operates to monitor and transmit the locations of the endpoint along said two or three dimensional predefined path and displays said locations on a human machine interface.

18. The manufacturing system of claim 11 further comprising a monitoring system that operates to monitor and transmit the locations of the endpoint in relation to one or more individual motors/drives.

19. The manufacturing system of claim 11 wherein said system control operates to activate or deactivate a tool at a predetermined time when said end point is at said predefined location and orientation.

20. The manufacturing system of claim 11 wherein said system control operates to change a starting location of said two or three dimensional predefined path.

* * * * *